United States Patent Office 3,346,294
Patented Oct. 10, 1967

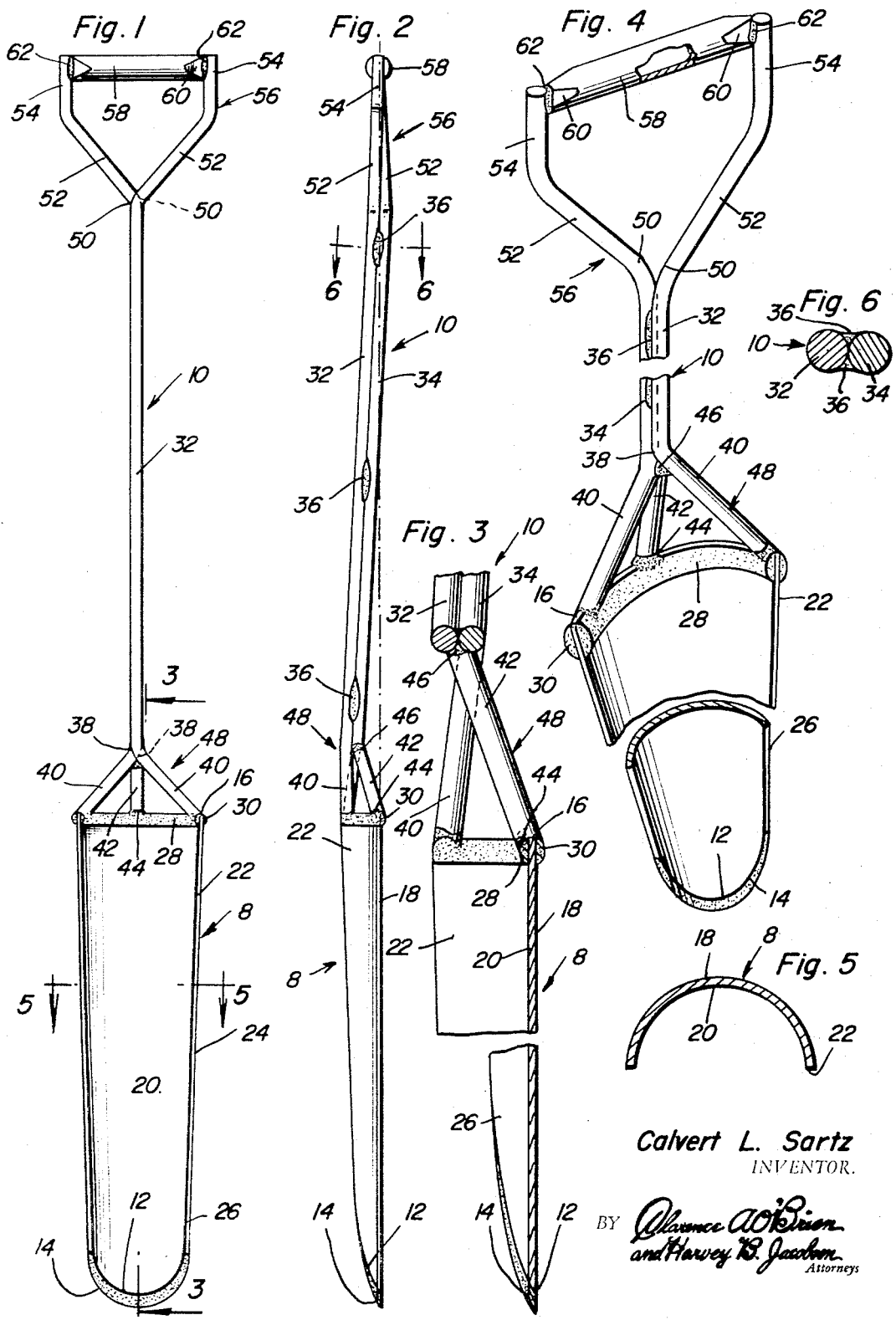

3,346,294
MULTIPURPOSE SHOVEL
Calvert L. Sartz, Rte. 3, Box 777,
Coos Bay, Oreg. 97420
Filed Oct. 5, 1965, Ser. No. 493,013
9 Claims. (Cl. 294—49)

ABSTRACT OF THE DISCLOSURE

A multipurpose shovel for planting trees beneath underbrush. The handle is provided with a blade having a curved configuration that tapers from said handle to a rounded keen root cutting edge. The handle is formed of two elongated rods secured together and specially joined to the rearward edge of the blade.

This invention relates to a manually usable shovel characterized by a novel blade, an improved elongated end thrust handle or shank, means affording a unique rigidified junctional connection between the lower leading end of the shank and upper trailing end of the blade, a yoke at the upper end of the shank, and a balanced oriented easy-to-use hand-grip fixed to and carried by said yoke and capable of one-handed use and control.

The shovel herein disclosed has the capability of many purposes and uses. It can be safely and aptly used to dig clams, earthworms and the like and provides a safety implement for camping and control of a campfire, if and when needed. It lends itself to feasible labor and time-saving use when planting trees and shrubs and is accordingly recommended for use by landscapers and, for that matter, by the average do-it-yourself home owner. It has been shown to be helpful to a motorist when called upon to cope with snow and ice difficulties. More particularly, this shovel can be helpfully used to free packed snow and ice from beneath vehicle fenders and steering control parts. With it one can also free packed and clinging ice from wheels and often avoid the perplexing job of applying anti-skid chains and so on.

Primarily, however, this shovel has been functionally designed and uniquely structurally adapted to be serviceable to workers engaged in forest lands where rehabilitation through planting new trees calls for an efficient and more practical shovel than is now available. Accordingly, a significant objective is to provide jobs for economic and equal opportunity, for example where west coast forestry achievements are currently sponsored and provide income which finds its way into the treasury. It follows too that with this improved shovel in hand individual users soon learn how best to handle it and become aptly and amply skilled to perform planting work with the degree of efficiency required for forestry needs.

Although the ready-to-use shovel weighs but 5.5 lbs., it is nevertheless aptly suited for the purposes for which it has been perfected. To the ends desired, the footrest commonly used is dispensed with and the junctional connection between the lower end of the shank and upper straight-across end of blade comprises a stabilized fork which is so designed and shaped that it constitutes and provides a brush parting spreader which enables the user to plant trees in dense undergrowth brush where wildlife usually do not browse.

The shovel herein revealed embodies certain significant features, one of which is designated as plumb bob profile for good thrust injection into the soil. All component parts are made of prescribed non-corrosive stainless steel for efficient results and little or no replacement of parts is ordinarily needed. The lower or leading end is equipped with a hard surface welding bead reground to maintain a sharp cutting edge for ease of soil penetration and, in addition, provides a reliable root splitter.

The arcuate shape of the slender ribless blade provides a long part-circular concave front face or surface which makes it feasible and practical for a user to line up and insert the toe of his shoe and guidingly rake and scrape the front face relatively clean. By the same token the convex rear or back face of the blade makes it similarly possible and practical to use the arch of the sole of the shoe for scraping and cleaning the rear face. The narrow width of the blade contributes to this featured innovation. The forming of upper ends of welded steel rods into a yoke carrying a tubular welded hand-grip is likewise a significant accomplishment.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 1 is a view in front elevation of a multipurpose shovel constructed in accordance with the principles of the present invention.

FIG. 2 is a view in edge elevation observing the shovel of FIG. 1 in a direction either left or right.

FIG. 3 is an enlarged fragmentary view with parts in section and elevation detailing the blade and the reinforced assembling and connecting fork between the lower end of the handle means and upper trailing edge of the blade, the section being on the line 3—3 of FIG. 1.

FIG. 4 is a view in perspective on a relatively large scale showing all of the essential component parts.

FIG. 5 is a section on the horizontal section line 5—5 of FIG. 1.

FIG. 6 is an enlarged cross-section on the horizontal section line 6—6 of FIG. 2.

The blade is denoted generally by the numeral 8 and the handle means by the numeral 10. The blade is relatively long, slender and smooth surfaced. The lower or leading end is arcuate as at 12 and is provided with a hard surface welding bead reground to maintain a keen cutting edge 14. The upper trailing edge 16 is straight across in a plane at right angles to the longitudinal axis of the over-all blade. The blade is of uniform thickness from end to end and the rear or back side is convex as at 18 while the front face or side is concave as at 20. The over-all blade is preferably but not necessarily, made of metal, for example, 16-gauge stainless steel. Other metals or woods fiber plastics can, if desired, be used. The upper portion 22 embodies a 6 inch arc of curvature while the median portion 24 is characterized by 5.25 inches arc of curvature. The lower or leading end portion 26 is characterized by 4.5 inches arc of curvature. The upper portion 22 is substantially semi-circular in cross-section as denoted in FIG. 5. It follows that the blade is gradually and progressively decreased in width from its upper trailing end to its lower leading end and the depth of the front side is gradually and proportionally decreased from the trailing to the leading end. Referring to the upper or trailing end it will be noted that it embodies a frontal reinforcement welding bead 28 which is substantially semi-circular in transverse section. A similar semi-circular arcuately rounding rear reinforcement welding bead is provided at 30, the upper trailing edge 16 being exposed through the upper curvilineal portions of the respective reinforcing beads 28 and 30 (FIGS. 3 and 4).

The handle means 10 is characterized by an elongated shank having novel means at its lower end integrated with the trailing end or edge 16. The shank proper comprises a pair of front and rear identical stainless steel or equivalent rods the front one of which is denoted at 32 and the rear one at 34 (FIG. 2). The portions of the rods constituting and providing the shank are superimposed one upon the other and joined at longitudinally spaced points by paired stainless steel or equivalent welding beads. The rods are solid and circular in cross-section and as shown in FIG. 6 the welding beads 36 of each pair are on diametrically opposite sides of and parallel to and directly opposite each other. These major rod portions coordinate in defining a dual-rod shank. The lower end portions of the rods are bent as at 38 (FIG. 1) and are spread apart in outwardly downwardly diverting relationship as at 40 and have their lower ends welded atop the edge 16 and coacting front and rear welding beads 28 and 30. Thus a substantially inverted V-shaped fork is provided and the components 40 constitute the arms of the fork. An additional or added short stainless steel or equivalent rod 42 is provided and constitutes a stabilizing brace or strut and has its lower end welded at 44 to a median or central portion of the edge 16 in line with the crest of the convex surface 18 of the blade. The upper end inclines forwardly and upwardly where it is welded as at 46 in the crotch of the V-shaped fork. The fork is denoted generally by the numeral 48 and constitutes not only a rigidifying connection between the shank and blade but also functions as a brush spreader which enables the tree planter to plant trees in dense undergrowth brush.

The respective upper end portions of the rods above the topmost welds are bent as at 50 and diverge outwardly and upwardly as at 52 and are then formed into generally straight opposed terminal end portions 54 whereby to thus define a yoke 56. This yoke provides a highly satisfactory mounting for the companion hand-grip 58. This hand-grip comprises a relatively short length of metal or equivalent pipe which bridges the space between the end portions 54 and which has its respective end portions 60 hammered and reduced in cross-sectional dimension with the terminals thereof anchored in place by stainless steel or equivalent welding beads 62.

It will be evident that the two one-half inch stainless steel rods are assembled and welded in back-to-back relationship and provide handle means which with the aid of the hand-grip assures maximum leverage. The fork means 48 constitutes and provides the aforementioned brush spreader and functions to ease shovel extraction from a hole in bushland terrain. It will be observed too that the 16-gauge blade is of uniform or even thickness from top to bottom, that the leading end is oval-like and appropriately hard surfaced to attain the desired root splitting and cutting edge. In practice the blade is type 304 with a No. 4 finish. Likewise the handle means and hand-grip means are type 304. Type 304 stainless steel has a yield strength of 35,000 p.s.i.; tensile strength 85,000 p.s.i.; elongation 50%; reduction of area 70% with the composition as follows: C .08 (max.); Mn 2.00 (max.); Si 1.00 (max.); Cr 18.00–20.00; Ni 8.00–12.00.

It is submitted that a careful consideration of the specification in conjunction with the illustrative, but not restrictive, views of the drawing will enable the reader to obtain the comprehensive understanding of the construction and coordination of the component parts and the features and advantages as well as the usual one-handed mode of use. Accordingly, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shovel of the class described comprising: a relatively long slender smooth-surfaced blade having an arcuate leading end and a straight-across trailing end in a plane at right angles to the long axis of the over-all blade, said blade being relatively narrow, uniform in thickness from end to end, the back of said blade being convex and the front concave, said blade being gradually and progressively decreased in width from its upper trailing end to its lower leading end, the depth of the front side gradually and proportionally decreasing from the trailing end to the leading end, and handle means embodying an elongated shank having means at its lower end integrated with said trailing end and having a yoke at its upper end provided with a fixedly mounted hand-grip, said shank comprising a pair of front and rear identical stainless steel rods superimposed one upon the other and joined by longitudinally spaced paired welding beads, said rods being circular in cross-section and the welding beads of each pair being located on diametrically opposite sides and parallel and directly opposite each other.

2. The shovel defined in claim 1, and wherein the upper end portions of said rods are bent outwardly into divergent relation, then oriented into spaced parallel relation and defining said yoke, said hand-grip comprising a length of pipe positioned between the terminal portions of said upper end portions and having its ends hammered and flattened and abutting and welded to their respectively cooperating terminal portions.

3. The shovel defined in claim 1, and wherein the lower end portions of said rods are directed outwardly into downwardly divergent relationship whereby to define an inverted V-shaped fork, the lower ends of the arms of said fork being welded to the respective ends of the trailing end of said blade and providing the aforementioned integrating means.

4. The structure defined in claim 3, and wherein the upper trailing end of the concave side of said blade is provided with a transverse frontal reinforcement welding bead, and also wherein the corresponding upper trailing end of the convex side is likewise provided with a transverse rear reinforcement welding bead.

5. The structure according to claim 4, and in combination, a short stabilizing rod similar in cross-section to said first named rods and situated vertically midway between said fork arms and sloping rearwardly and downwardly and having an upper end located in the crotch portion of said V-shaped fork and welded in place, and having its lower end resting atop and welded to a centralized part of said trailing end, said stabilizing rod in conjunction with the arms of said fork providing a brush spreader for ease of extraction when said shovel is lifted through tangled brush and undergrowth.

6. The shovel according to claim 1, and wherein the tip portion of said leading end is provided with a hard surface welding bead sharpened and defining a keen cutting edge serving as a root splitter.

7. The structure defined in claim 6, and wherein said hand-grip is disposed in a plane which is coplanar with the lengthwise centralized crest of the convex side of said blade to achieve balanced one-handed thrust injection of the leading end into the soil which is to be forcibly penetrated.

8. For use by a tree planter when called upon to plant trees in wooded ground covered with dense undergrowth and brush; a tree planting shovel comprising a relatively long slender smooth-surfaced blade having an arcuate leading end and a straight-across trailing end in a plane at right angles to the long axis of the over-all blade, said blade being made of stainless steel and being relatively narrow, uniform in thickness from end to end, the back of said blade being convex and the front concave, said blade being gradually and progressively decreased in width from its upper trailing end to its lower leading end, the depth of the front side gradually and proportionally decreasing from the trailing end to the lead end, an elongated thrust-type handling shank having an inverted V-shaped fork with a coacting brace, the lower ends of the arms of said fork welded to spaced portions of said trailing end, said fork and companion brace having the added function of a brush spreader during the period of extraction of said blade, said shank embodying a pair of face-to-face contacting duplicate rods affixed to each other, said rods being fashioned at upper ends into a yoke, the upper ends of the components of said yoke having a hand-grip fixedly mounted therebetween, said blade, fork, rods and hand-grip being made of stainless steel and welded together, the tip portion of the leading end of said blade having a hard surface welding bead integral therewith, sharpened and providing a root splitter.

9. A multipurpose shovel comprising a relatively long slender blade, said blade being concavo-convex in transverse cross-section from end to end and having an arcuate leading end provided with a hard-surface welding bead sharpened to provide a keen cutting and root splitting edge, the trailing end of said blade being straight across and disposed at right angles to the long axis of said blade, the front concave surface being of a dimension that the user can line up and insert the toe of his shoe and guidingly rake and scrape the surface and clear it of mud and debris, the rear convex surface likewise being of a slender contour and dimension that the user can use the arch of the sole of his shoe in scraping and cleaning said surface, and handle means embodying an elongated shank comprising a like front and rear rods superimposed one upon the other, said rods being elongated, circular in cross-section and joined by pairs of welding beads, the beads of each pair being located on diametrically opposite sides of the rods and parallel and opposed to each other, there being three pairs of beads, each pair spaced longitudinally from the next adjacent pair, the lower ends of said rods being directed outwardly and downwardly and joined to the upper trailing end of said blade, and a hand-grip carried by the upper ends of said rods.

References Cited
UNITED STATES PATENTS

| | | | |
|---|---|---|---|
| 1,263,949 | 4/1918 | Singer | 294—49 |
| 2,823,470 | 2/1958 | Page | 294—55 X |
| 3,226,149 | 12/1965 | McJohnson | 294—49 X |

GERALD M. FORLENZA, *Primary Examiner.*

G. F. ABRAHAM, *Assistant Examiner.*